United States Patent
Wang et al.

(10) Patent No.: US 10,120,516 B2
(45) Date of Patent: Nov. 6, 2018

(54) TOUCH ELECTRODE, DISPLAY PANEL AND DISPLAY DEVICE

(71) Applicants: BOE Technology Group Co., Ltd., Beijing (CN); Hefei Xinsheng Optoelectronics Technology Co., Ltd., Anhui (CN)

(72) Inventors: Zhun Wang, Beijing (CN); Lei Zhang, Beijing (CN); Jun Li, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 90 days.

(21) Appl. No.: 15/220,091

(22) Filed: Jul. 26, 2016

(65) Prior Publication Data
US 2017/0075463 A1    Mar. 16, 2017

(30) Foreign Application Priority Data
Sep. 16, 2015  (CN) .......................... 2015 1 0590842

(51) Int. Cl.
*G06F 3/041* (2006.01)
*G06F 3/047* (2006.01)
(Continued)

(52) U.S. Cl.
CPC .... *G06F 3/044* (2013.01); *G06F 2203/04111* (2013.01); *G06F 2203/04112* (2013.01)

(58) Field of Classification Search
CPC .......... G06F 3/044; G06F 2203/04112; G06F 2203/04111
See application file for complete search history.

(56) References Cited

U.S. PATENT DOCUMENTS

| 9,007,333 B1* | 4/2015 | Wilson | G06F 3/044 |
| | | | 178/18.06 |
| 2014/0092519 A1* | 4/2014 | Yang | H05F 3/04 |
| | | | 361/220 |

(Continued)

FOREIGN PATENT DOCUMENTS

| CN | 102915147 A | 2/2013 |
| CN | 104035627 A | 9/2014 |
| CN | 104267855 A | 1/2015 |

OTHER PUBLICATIONS

Sep. 15, 2017—(CN) First Office Action Appn 201510590842.1 with English Tran.

(Continued)

*Primary Examiner* — Andrew Sasinowski
(74) *Attorney, Agent, or Firm* — Banner & Witcoff, Ltd.

(57) ABSTRACT

A touch electrode, a display panel and a display device are provided. The touch electrode includes a plurality of first electrodes provided along a first direction, a plurality of second electrodes provided along a second direction, a first conductive portion, an insulation layer and a second conductive portion. Adjacent ones of the first electrodes are connected through the first conductive portion, on which the insulation layer is arranged; adjacent ones of the second electrodes are connected through the second conductive portion which is provided on the insulation layer; and the second conductive portion includes a plurality of wires, at least one wire has a width smaller than a first preset value, and the wire having the width smaller than the first preset value is configured for the release of static electricity.

17 Claims, 6 Drawing Sheets

(51) Int. Cl.
   *G06F 3/045*  (2006.01)
   *G06F 3/044*  (2006.01)

(56) References Cited

U.S. PATENT DOCUMENTS

| | | | | |
|---|---|---|---|---|
| 2014/0160372 A1* | 6/2014 | Li | ............................ | G06F 3/044 349/12 |
| 2015/0001060 A1* | 1/2015 | Kim | ......................... | G06F 3/044 200/600 |
| 2015/0370370 A1* | 12/2015 | Ikeda | ...................... | G06F 3/044 349/12 |
| 2015/0370394 A1* | 12/2015 | Cheng | ..................... | G06F 3/044 345/173 |
| 2016/0034076 A1* | 2/2016 | Chien | .................... | G09G 5/003 345/173 |
| 2016/0109980 A1* | 4/2016 | Lee | ......................... | G06F 3/044 345/174 |
| 2016/0202827 A1* | 7/2016 | Bae | ......................... | G06F 3/044 345/174 |

OTHER PUBLICATIONS

Jan. 25, 2018—(CN) Second Office Action Appn 201510590842.1 with English Tran.

* cited by examiner

TOUCH ELECTRODE, DISPLAY PANEL AND DISPLAY DEVICE

This application claims priority to and the benefit of Chinese Patent Application No. 201510590842.1 filed on Sep. 16, 2015, which application is incorporated herein in its entirety.

TECHNICAL FIELD

Embodiments of the present disclosure relate to a touch electrode, a display panel and a display device.

BACKGROUND

In existing touch electrode structures, the bridging portion joining adjacent electrodes is generally located at the thinnest location within an electrode layer, and the bridging portion has a surface curvature greater than other conductors within the electrode layer. When static charges are generated in the electrode layer, the static charges tend to accumulate at the position having a relatively great curvature, that is to say, tend to accumulate at the bridging portion, and cause electrostatic discharge. Accumulation of too many static charges can cause a relatively strong release current, thus a large current may pass through the bridging portion, the current tends to fuse the bridging portion, and then an open circuit between the electrodes connected by the bridging portion is caused.

SUMMARY

At least one embodiment of the present disclosure provides a touch electrode, which includes a plurality of first electrodes provided along a first direction, a plurality of second electrodes provided along a second direction, a first conductive portion, an insulation layer and a second conductive portion. Adjacent ones of the first electrodes are connected with each other through the first conductive portion, the insulation layer is arranged on the first conductive portion, adjacent ones of the second electrodes are connected with each other through the second conductive portion, and the second conductive portion is provided on the insulation layer; and the second conductive portion includes a plurality of wires, at least one wire has a width smaller than a first preset value, and the wire having the width smaller than the first preset value is configured for release of static electricity.

At least one embodiment of the present disclosure further provides a display panel which includes the above touch electrode.

At least one embodiment of the present disclosure further provides a display device which includes the above display panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to provide a clearer understanding of the objects, features and advantages of the present disclosure, a further detailed description of the present disclosure will be made below in conjunction with the drawings and specific embodiments. To be specified, the embodiments and the features therein can be combined with each other in the case of no conflict.

Figure 1:
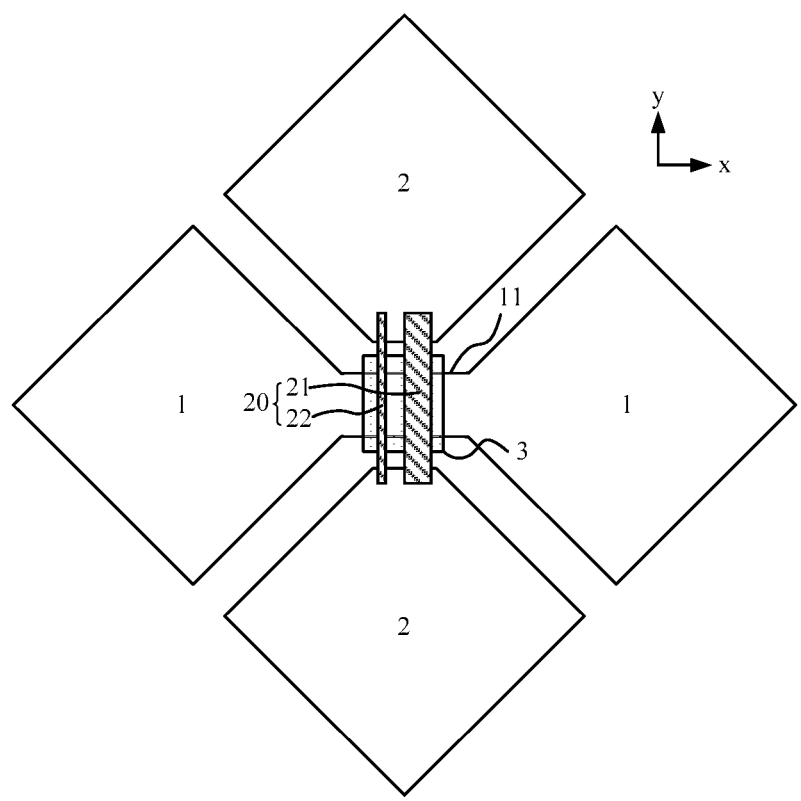
FIG. 1 illustrates a structural schematic view of a touch electrode according to an embodiment of the present disclosure.

As illustrated in FIG. 1, the touch electrode according to an embodiment of the present disclosure includes a plurality of first electrodes 1 provided in order along a first direction (for example, the X-direction), and a plurality of second electrodes 2 provided in order along a second direction (for example, the Y-direction). For example, the first direction is perpendicular to the second direction. In other embodiments, the first direction is not perpendicular to the second direction, so long as they are distinct directions.

The adjacent first electrodes are connected with each other by a first conductive portion 11, an insulation layer 3 is arranged on the first conductive portion 11 (the arrangement of the insulation layer 3 include, but not limited to the structure shown in FIG. 1), the adjacent second electrodes 2 are connected with each other by a second conductive portion 20, the second conductive portion 20 is provided on the insulation layer 3, the second conductive portion 20 includes a plurality of wires, at least one wire has a width along the first direction smaller than a first preset value, and the wire having the width smaller than the first preset value is configured for the release of static electricity. To be specified, the wire having the width smaller than the first preset value can also electrically connect the adjacent second electrodes together in a condition where the open circuit is not caused. The second conductive portion 20 in at least one embodiment of the present disclosure is a bridging portion between the second electrodes 2. Because the second conductive portion is divided into the plurality of wires, at least one wire has a relatively small width, that is, a relatively great surface curvature, in a situation where static charges are generated at the second electrodes 2, the charges readily accumulate at the finer wire (namely the wire having the relatively small width); and even if the finer wire is fused during the electrostatic discharge, it is also possible to ensure normal electric conduction with other thick wire in the second conductive portion 20, and thus the occurrence of open circuit between the second electrodes 2 of the touch electrode caused by the electrostatic discharge can be avoided.

For example, the plurality of wires included by the second conductive portion 20 includes one main wire, a width of which is greater than or equal to the first preset value, and in such a case, the at least one wire, included by the plurality of wires, having the width smaller than the first preset value includes a sub-wire. For example, as illustrated in FIG. 1, the second conductive portion 20 includes a main wire 21 and a sub-wire 22, both the main wire 21 and the sub-wire 22 lead through adjacent second electrodes 2 (namely electrically connect the adjacent second electrodes 2 together), the sub-wire 22 has a width smaller than that of the main wire 22, and the sub-wire 21 is configured for the release of static electricity.

For example, the above first preset value is 8 μm.

Generally, a wire having a width about 8 μm can be configured for leading through adjacent second electrodes. By providing one main wire 21 with the width greater than or equal to 8 μm in the plurality of wires, on one hand, it is possible to ensure that the main wire 21 can well lead through adjacent second electrodes; on the other hand, it is also possible to ensure that electric charges does not tend to accumulate at the main wire 21 with respect to other finer sub-wire 22 and thus the main wire 21 is not easy to be fused. And the main wire 21 has a relatively large width and a less resistance, and thus can ensure a favorable signal transmission effect.

To be specified, only one sub-wire 22 is illustrated in FIG. 1, in practice, however, a plurality of sub-wire 22 can be provided as required to cooperate with the one main wire 21 for electric conduction.

For example, the main wire 21 is spaced apart from the sub-wire 22, for example, as illustrated in FIG. 1, the main wire 21 is parallel to the sub-wire 22.

Figure 2:
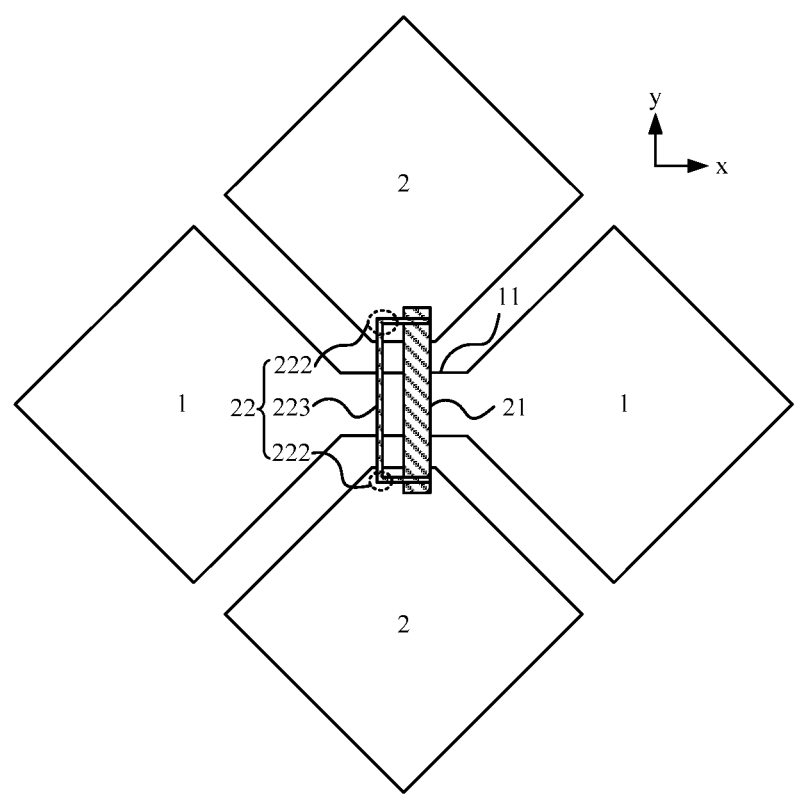
FIG. 2 illustrates a structural schematic view of a touch electrode according to another embodiment of the present disclosure.

For example, as illustrated in FIG. 2, the sub-wire 22 having the width smaller than the first preset value in the above plurality of wires intersects with the main wire 21; and the sub-wire 22 is a bending wire, the bending portions 222 of the sub-wire 22 are respectively in electrical connection with the second electrodes 2, and the middle part 223 between the bending portions 222 of the sub-wire 22 is separated from the main wire 21. FIG. 2 shows an example in which the wire 22 includes two bending portions 222. Certainly, the number of the bending portions included by the wire 22 may also be one or greater than or equal to three.

The bending portion 222 of the sub-wire 22 has a curvature greater than that of other locations of the sub-wire 22, this causes the static charges easier to accumulate at the bending portion 222, and thus the release of static charges through the second electrode 2 is facilitated.

Figure 3:
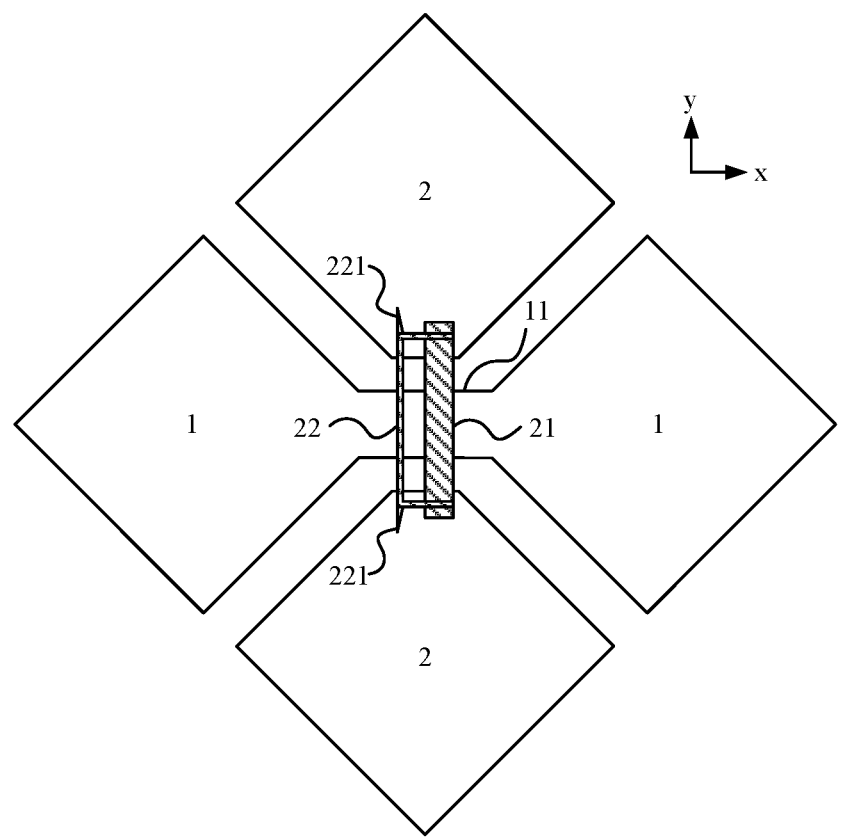
FIG. 3 illustrates a structural schematic view of a touch electrode according to another embodiment of the present disclosure.

For example, as illustrated in FIG. 3, the sub-wire 22 is formed with at least one sharpened protrusion 221 (FIG. 3 shows an example in which a sharpened protrusion 221 is formed at each of two bending portions, respectively) at the bending portion (not marked in FIG. 3), the sharpened protrusion 221 is in electrical connection with the second electrode 2, and the tip of the sharpened protrusion 221 is separated from the main wire 21.

At least one embodiment of the present disclosure can also form the sharpened protrusion 221 at the bending portion based on the provision of the bending portion, so that the static charges accumulated at the bending portion can be released quickly through the sharpened protrusion and thus the influence of the static charge against the sub-wire 22 is depressed.

Figure 4:
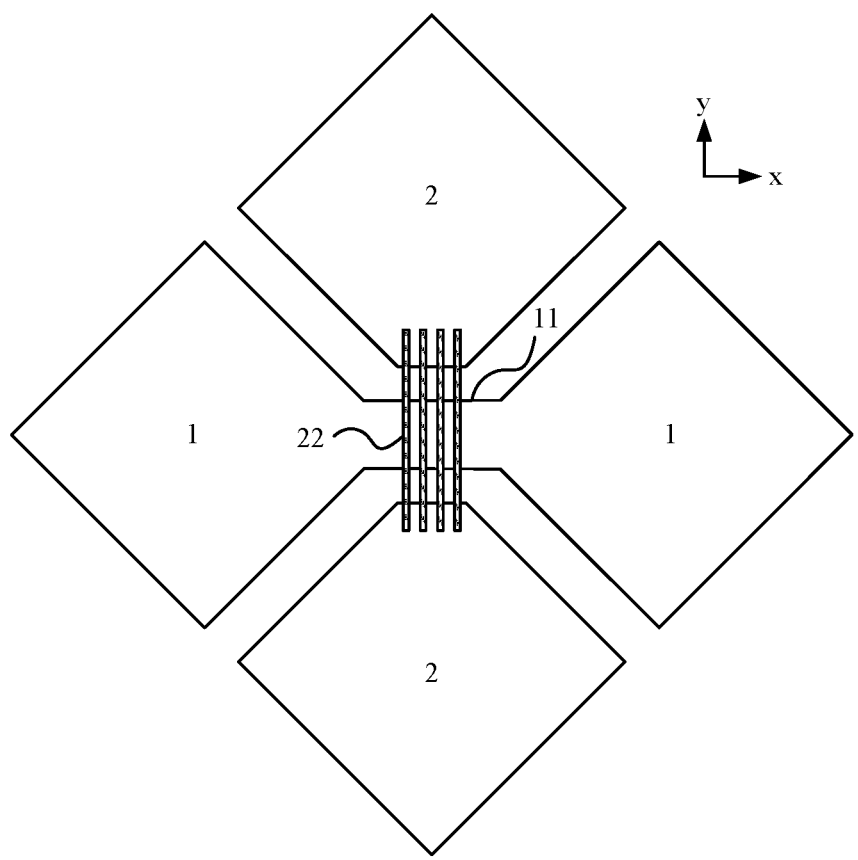
FIG. 4 illustrates a structural schematic view of a touch electrode according to another embodiment of the present disclosure.

For example, as illustrated in FIG. 4, each of the plurality of wires has a width smaller than the first preset value. That is to say, each of the wires is relatively fine and can be used as a sub-wire 22. By providing a plurality of relatively fine sub-wires, on one hand, it is possible to make each of the sub-wires 22 effective in the release of static electricity, and on the other hand, due to the fact that a touch electrode is commonly provided at the surface of a display panel and is easy to be scratched to generate the open circuit, by providing the plurality of sub-wires, even several sub-wires are broken due to scratching, the remained sub-wires still can ensure the electrical connection between the adjacent second electrodes.

For example, the sum of the widths of the plurality of wires is greater than or equal to a second preset value which is greater than the first preset value.

For example, the above wire having the width smaller than the first preset value has a width of 3 μm.

For example, 4 wires may be provided and each of the wires has a width of 3 μm. In a situation where the length and the conductivity of the wire is given, due to the resistance of the wire is inversely proportional to the cross-sectional area of the wire, the greater the width of the wires is, the greater cross-sectional area the wire has, and thus the resistance is smaller. Therefore, in a situation that a plurality of wires are provided and the length and conductivity of the wires are set, by setting the sum of the widths of the plurality of wires to be greater than or equal to the second preset value, it is possible to make the total resistance of the plurality of wires relatively small. Because the second preset value is greater than the first preset value and the first preset value is 8 μm, for example, the second preset value can be 12 μm (certainly, the second preset value can also be smaller than 12 μm, as long as greater than the first preset value), for example, 4×3 μm=12 μm being greater than 8 μm. The increment in cross-sectional area may counteract the resistance growth caused by the wire being a bending wire to a certain extent, ensure a relatively small total resistance of the plurality of wires, and thereby ensure a favorable signal transmission effect between adjacent second electrodes.

Figure 5:
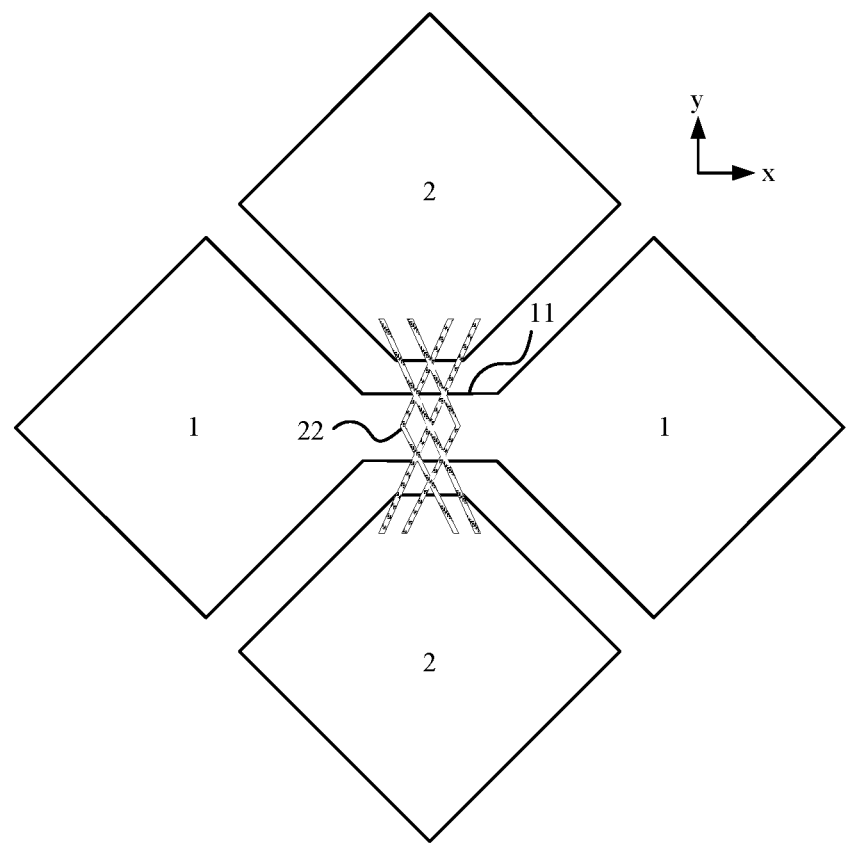
FIG. 5 illustrates a structural schematic view of a touch electrode according to another embodiment of the present disclosure.

For example, as illustrated in FIG. 5, a part of the plurality of wires intersects with another part of the wires to form a mesh pattern. A thicker wire can significantly shield a single sub-pixel; and in at least one embodiment of the present disclosure, the wires intersected in a mesh pattern have a less influence upon the light emitting from the pixels below the wires, and thus it is possible to uniformly shield a plurality of sub-pixels, avoid color cast, and increase the light transmittance to a certain extend.

For example, the plurality of wires has an integrated structure, namely the plurality of wires is formed integrally. In this way, it can ensure that there is no lap joints or weld portions at locations where the plurality of wires intersects with each other, that is to say, there is no additional resistance, thus it can be ensured that the overall resistance of the plurality of wires is not too large, and the signal transmission effect of the second electrode is guaranteed.

At least one embodiment of the present disclosure also provides a display panel including the touch electrode provided by any one of the above embodiments.

Figure 6:
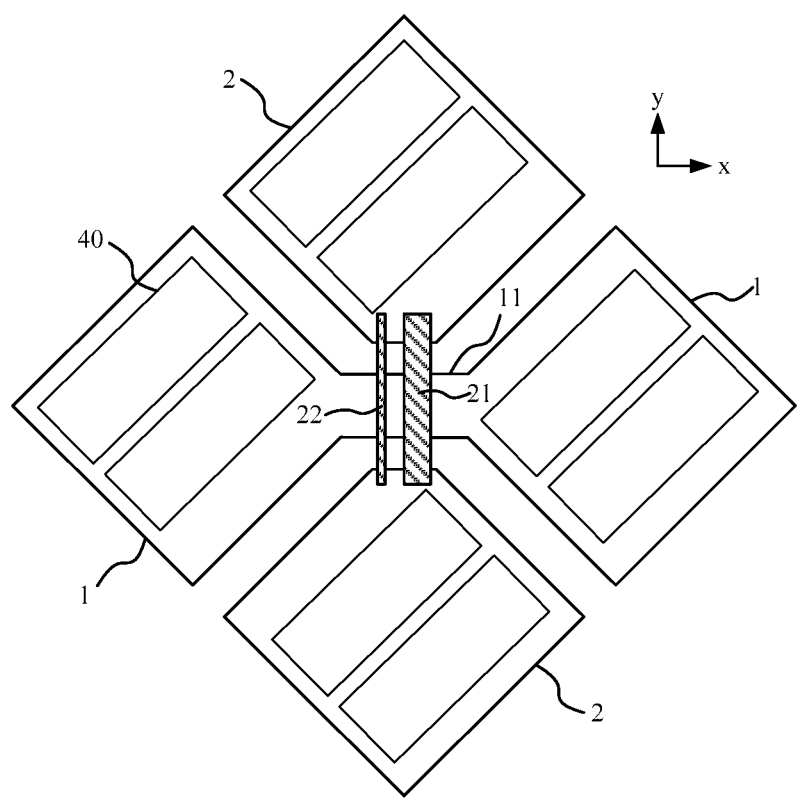
FIG. 6 illustrates a schematic top view of a display panel according to an embodiment of the present disclosure.

For example, as illustrated in FIG. 6, the display panel further includes a plurality of sub-pixels 40 which are located below the touch electrode; that is to say, the light for imaging firstly passes through the sub-pixels and then passes through the touch electrode.

For example, an angle α between the plurality of wires of the touch electrode and the plurality of sub-pixels (namely the angle between the wires and the plane where the sub-pixels are located) is in a range of 0°<α<90°. If the second conductive portion is parallel to the sub-pixels, a significant shielding can occur upon a certain sub-pixel, then there can be a bridging-bottom shadow effect or a grating interference effect, and this can influence the display effect. This embodiment provides such a structure in which the wires form a certain angle with respect to the sub-pixels, and thus it can prevent the diffraction of the light from the sub-pixels from occurring at the second conductive portion due to the second conductive portion being parallel to the sub-pixels in the pixel unit.

The display panel provided by any one of the embodiments of present disclosure may be a display panel of any type, such as a liquid crystal panel, an OLED (organic light-emitting diode) panel or the like.

At least one embodiment of the present disclosure also provides a display device including the above display panel.

To be specified, the display device of the embodiment of present disclosure may be an electronic paper, a cell phone, a tablet computer, a television, a notebook computer, a digital photo frame, a navigator or any products or parts having the display function.

Because the bridging portion between the electrodes has a larger curvature than other conductors in the electrode layer, the electrostatic discharge is easy to fuse the bridging portion so that the electrode is unable to transmit the signals normally. With the technical solution of the embodiments of present disclosure, the bridging portion (namely the second conductive portion) connecting the electrodes can be divided into a plurality of wires, at least one wire has a finer width, that is, has a larger surface curvature, when static charges are generated at the electrodes, the charges are easier to accumulate at the finer wire, and thus even if the finer wire is fused during the electrostatic discharge, it is still possible to ensure that other thicker wire in the bridging portion makes electric conduction normally, thus avoiding the occurrence of open circuit in the touch electrode caused by the electrostatic discharge and ensuring the normal signal transmission in the touch electrode.

To be noted, the size and shape of each structure in the drawings do not reflect the actual ratio, it is solely intend to schematically describe the content of the embodiment of present disclosure. Furthermore, it is to be understood that when an element or a layer is referred as "above" or "on" another element or layer, it can be directly on the other element, or alternatively, there can be an intermediate layer. In addition, it should be understood that when an element or a layer is referred as "below" another element or layer, it can be directly below the other elements, or alternatively, there can be more than one intermediate layers or elements. In addition, it can also be understood that when a layer or an element is referred as "between" two layers or two elements, it can be the only layer between the two layers or the two elements, or there can also have more than one intermediate layers or elements. Like reference marks throughout the description indicate like elements.

In the present disclosure, the terms "first" and "second" are used merely for the purpose of description, instead of being understood as indication or suggestion of relative importance. The term "a plurality of" means two or more, unless there is other explicit limitation.

What are described above is related to the illustrative embodiments of the disclosure only and not limitative to the scope of the disclosure; the scopes of the disclosure are defined by the accompanying claims.

This application claims the benefit of Chinese Patent Application No. 201510590842.1, filed on Sep. 16, 2015, which is hereby entirely incorporated by reference as a part of the present application.

What is claimed is:

1. A touch electrode, comprising a plurality of first electrodes provided along a first direction, a plurality of second electrodes provided along a second direction, a first conductive portion, an insulation layer and a second conductive portion, wherein
    adjacent ones of the first electrodes are connected with each other through the first conductive portion, the insulation layer is arranged on the first conductive portion, adjacent ones of the second electrodes are connected with each other through the second conductive portion, and the second conductive portion is provided on the insulation layer; and
    the second conductive portion comprises a plurality of electric conductor wires, at least one electric conductor wire has a width smaller than a first preset value, the at least one electric conductor wire comprises a sub-electric conductor wire having the width smaller than the first preset value, the plurality of the electric conductor wires comprises a main electric conductor wire having a width greater than or equal to the first preset value, and the electric conductor wire having the width smaller than the first preset value is configured for release of static electricity.

2. The touch electrode according to claim 1, wherein the first direction is perpendicular to the second direction.

3. The touch electrode according to claim 1, wherein the sub-electric conductor wire intersects with the main electric conductor wire, and the sub-electric conductor wire is a bending electric conductor wire, a bending portion of which is in electrical connection with one of the second electrodes; and an orthographic projection of the bending portion of the sub-electric conductor wire on the second electrodes is within a region where the second electrodes connected with the sub-electric conductor wire is located.

4. The touch electrode according to claim 3, wherein the sub-electric conductor wire is formed with at least one sharpened protrusion at the bending portion, and the sharpened protrusion is in electrical connection with the one of the second electrodes.

5. The touch electrode according to claim 3, wherein the plurality of electric conductor wires has an integrated structure.

6. The touch electrode according to claim 1, wherein the first preset value is 8 µm.

7. The touch electrode according to claim 1, wherein the electric conductor wire having the width smaller than the first preset value is 3 µm in width.

8. The touch electrode according to claim 1, wherein the plurality of electric conductor wires has an integrated structure.

9. A display panel comprising the touch electrode according to claim 1.

10. The display panel according to claim 9, further comprising a plurality of sub-pixels provided below the touch electrode.

11. The display panel according to claim 10, wherein an angle α between the plurality of sub-pixels and a plane where the plurality of electric conductor wires is located is in a range of 0°<α<90°.

12. A display device comprising the display panel according to claim 9.

13. A touch electrode, comprising a plurality of first electrodes provided along a first direction, a plurality of second electrodes provided along a second direction, a first conductive portion, an insulation layer and a second conductive portion, wherein
    adjacent ones of the first electrodes are connected with each other through the first conductive portion, the insulation layer is arranged on the first conductive portion, adjacent ones of the second electrodes are connected with each other through the second conductive portion, and the second conductive portion is provided on the insulation layer;

the second conductive portion comprises a plurality of electric conductor wires, each of the plurality of electric conductor wires has a width smaller than a first preset value, a part of the plurality of electric conductor wires intersects with another part of the plurality of electric conductor wires to form a mesh pattern, and the plurality of electric conductor wires is inclined with respect to both the first direction and the second direction.

14. The touch electrode according to claim 13, wherein a sum of widths of the plurality of electric conductor wires is greater than or equal to a second preset value, and the second preset value is greater than the first preset value.

15. The touch electrode according to claim 13, wherein the first preset value is 8 μm.

16. The touch electrode according to claim 13, wherein the electric conductor wire having the width smaller than the first preset value is 3 μm in width.

17. A touch electrode, comprising a plurality of first electrodes provided along a first direction, a plurality of second electrodes provided along a second direction, a first conductive portion, an insulation layer and a second conductive portion, wherein adjacent ones of the first electrodes are connected with each other through the first conductive portion, the insulation layer is arranged on the first conductive portion, adjacent ones of the second electrodes are connected with each other through the second conductive portion, and the second conductive portion is provided on the insulation layer; and the second conductive portion comprises a plurality of electric conductor wires, at least one electric conductor wire has a width smaller than a first preset value, the electric conductor wire having the width smaller than the first preset value is configured for release of static electricity, the at least one electric conductor wire having the width smaller than the first preset value comprises a sub-electric conductor wire, the sub-electric conductor wire comprises a bending portion, the sub-electric conductor wire is formed with at least one sharpened protrusion at the bending portion, and the sharpened protrusion is in electrical connection with the one of the second electrodes.

* * * * *